United States Patent
Bejerano et al.

(10) Patent No.: US 8,644,329 B2
(45) Date of Patent: Feb. 4, 2014

(54) POWER AWARE POINT-OF-PRESENCE DESIGN AND AUTO-CONFIGURATION

(75) Inventors: Yigal Bejerano, Springfield, NJ (US); Sudarshan Vasudevan, Tarrytown, NY (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/464,651

(22) Filed: May 4, 2012

(65) Prior Publication Data
US 2013/0294454 A1 Nov. 7, 2013

(51) Int. Cl.
*H04L 12/58* (2006.01)
(52) U.S. Cl.
USPC .......................................... 370/419; 370/359
(58) Field of Classification Search
USPC ........................ 370/349, 389, 359, 419, 420
See application file for complete search history.

(56) References Cited

U.S. PATENT DOCUMENTS 8,248,937 B2 * 8/2012 Yang et al. .................... 370/232

FOREIGN PATENT DOCUMENTS

| EP | 1 091 520 A2 | 4/2001 |
|---|---|---|
| EP | 1 401 155 A1 | 3/2004 |
| WO | WO 2010/089145 A2 | 8/2010 |

OTHER PUBLICATIONS

Notification of the Transmittal/Search Report and the Written Opinion of the International Searching Authority, or the Declaration, mailed Oct. 4, 2013 in International Appl. No. PCT/US2013/039492, 10 pages.

* cited by examiner

*Primary Examiner* — Brenda H Pham
(74) *Attorney, Agent, or Firm* — Kramer & Amado P.C.

(57) ABSTRACT

A power aware Point-Of-Presence design and auto-configuration method is disclosed for configuring which network elements within a point-of-presence are powered so as to accommodate anticipated traffic while minimizing power consumption. The IP power aware Point-Of-Presence design and auto-configuration method includes a set of activation thresholds associated with each port in the Point-of-Presence that indicates that the port should be activated when the traffic demand exceeds the threshold. The power aware Point-Of-Presence design and auto-configuration method is particularly useful for providing a configuration which accounts for both external and internal link traffic demand and has the further advantage of ordering the port activation such that only a minimum number of activation and deactivation operations to satisfy a new demand is required. This property is advantageous for limiting the routing instabilities caused by topological changes in response to varying demand.

2 Claims, 4 Drawing Sheets

| | | | | | | | | |
|---|---|---|---|---|---|---|---|---|
| AN-1 | <0, 1> | <⅛, 2> | <¼, 3> | <⅜, 4> | <½, 5> | <⅝, 6> | <¾, 7> | <⅞, 8> |
| AN-2 | <0, 1> | | <¼, 2> | | <½, 3> | | <¾, 4> | |
| AN-3 | <0, 1> | | | | <½, 2> | | CR-3 | |
| AN-4 | <0, 1> | | | CR-2 | <½, 2> | | | |
| | CR-1 | | | | | | | |

| | | | | | | | | |
|---|---|---|---|---|---|---|---|---|
| AN-1 | <0, 1> | <⅛, 2> | <¼, 3> | <⅜, 4> | <½, 5> | <⅝, 6> | <¾, 7> | <⅞, 8> |
| AN-2 | <0, 1> | | <¼, 2> | | <½, 3> | | <¾, 4> | CR-4 |
| AN-3 | <0, 1> | | | CR-2 | <½, 2> | CR-3 | | |
| AN-4 | <0, 1> | CR-1 | | | <½, 2> | | | |

POWER AWARE POINT-OF-PRESENCE DESIGN AND AUTO-CONFIGURATION

FIELD OF THE INVENTION

The invention relates to generally to connections between points-of-presence and is particularly concerned with a method of configuring which network elements within a point-of-presence are powered so as to accommodate anticipated traffic while minimizing power consumption.

BACKGROUND OF THE INVENTION

Current telecommunication networks operate at a nearly constant power independent of the traffic load. The temporal traffic demand can be substantially smaller than the overall network capacity. It is generally accepted that the significant discrepancy between traffic demand and network capacity is a consequence of significant variations in network traffic over time as well as capacity over-provisioning by network service providers.

Since the Internet backbone consists of a network of Points-of-Presences (PoPs) optimizing the energy consumption of each individual PoP may serve as a means of achieving network-wide power efficiency.

In modern IP networks, each PoP consists of multiple core and access routers that are co-located and which are interconnected as follows. The access routers serve as the endpoints of the regional networks and connect to the core routers. The core routers of a given PoP are typically connected together in a full mesh. In addition, the core routers of one PoP are connected to core routers of one or more distinct PoPs. Further, in current practice the connectivity between core routers of distinct PoPs typically employs link aggregation (or equivalently, link bundling) that combines multiple physical links into a single logical link.

The gap between the available network capacity and the temporal traffic demand presents opportunities for deactivating network components without significantly affecting network performance while reducing the network power consumption. Therefore, it would be desirable to have a system or method capable of determining which network components to deactivate or alternately activate in order to reduce the power consumption within a PoP without significantly affecting network performance.

SUMMARY OF THE INVENTION

It is an object of the invention to provide a method and system for minimizing power consumption at a Point-of-Presence without significantly affecting network performance.

Thus, according to an aspect of the invention there is provided a method of activating network elements within a Point-of-Presence node having a first core router, a set of linecards having respective ports associated with the first core router, the activation in respect of a traffic demand associated with the Point-of-Presence node, the method having the steps of: calculating a set of activation thresholds wherein each port of the set of linecards has a respective activation threshold; determining the traffic demand at a particular point in time; activating a particular port on a linecard if the respective activation threshold is exceeded by the traffic demand; placing the particular port in a power minimization mode if the respective activation threshold is not exceeded by the traffic demand; and wherein a linecard in the set of linecards is placed in a power minimization mode if no ports on the linecard are activated.

According to another aspect of the invention there is provided a system within a Point-of-Presence node having a first core router, a set of linecards having respective ports associated with the first core router, and a traffic demand associated with the Point-of-Presence node having a memory having a set of activation thresholds wherein an activation threshold is associated with a port of the set of linecards; and a controller which activates a particular port on a linecard in the event that the traffic demand exceeds the respective activation threshold associated with that port; and which places the particular port in a power minimization mode if the respective activation threshold is not exceeded by the traffic demand; and which also places a linecard in the set of linecards in a power minimization mode if no ports on the linecard are activated.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

Figure 1:
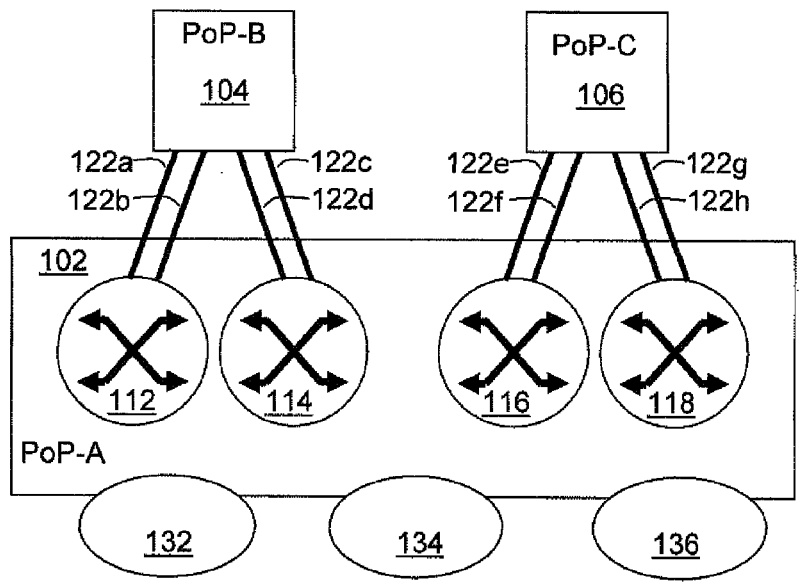
FIG. 1 illustrates a network of PoPs having connecting links according to the prior art.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In the following figures, like reference numbers are used to represent like elements.

INITIAL EXAMPLE

Figure 2:
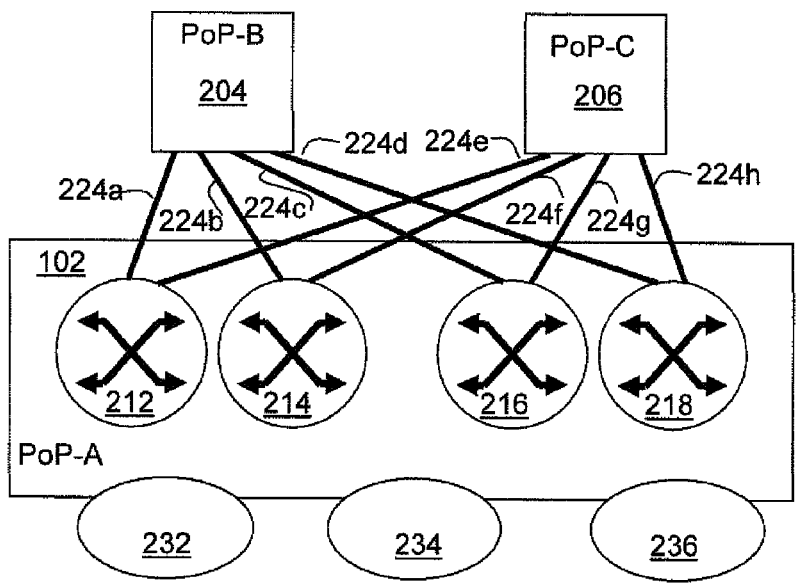
FIG. 2 illustrate a network of PoPs having connecting links according to an embodiment of the invention.

An illustrative example that suggests the advantages of power-aware PoP design and auto-configuration may be seen in FIGS. 1 and 2. Consider a network with three PoPs 102, 104, and 106 as shown in FIG. 1. The purpose of this example is focus on the interconnections of PoP-A 102 with the other two PoPs, termed PoP-B 104 and PoP-C 106. It is assumed that every core router is connected to all regional networks 132, 134, and 136. PoP-A contains four core routers (CRs) 112, 114, 116, and 118, each of which has two 100 Gbps ports 122$a$ and 122$b$, 122$c$ and 122$d$, 122$e$ and 122$f$, 122$g$ and 122$h$, respectively, for inter-PoP communication. In this example, the traffic demand between PoP-A and each of the other PoPs is 200 Gbps during periods of peak demand and only 100 Gbps during periods corresponding to the valley. FIG. 1 shows that the PoPs are over-provisioned by a factor of two. Notice that the example in FIG. 1 allows two possibilities for interconnections between PoP-A 102 and the other two PoPs 104 and 106. For this example, assume that each router (chassis) has a power footprint of 10 kW, excluding the power consumption of the ports, and each port has a power footprint of 5 kW.

Next, the power consumption in four different scenarios are enumerated. The first three consider the PoP connectivity based on link aggregation (also called link bundling) as shown in FIG. 1, while the impact of an alternative PoP design is demonstrated in FIG. 2.

Always On:

In this case, all network elements are always powered on. A simple calculation shows that the total power consumption is $$4 \cdot (10+2 \cdot 5)=80 \text{ kW.}$$

Explicit Over-Provisioning:

Assume here that the network is operating under peak demand and simply exploit the fact that the network is over-provisioned by a factor of two. Thus, for instance, it is possible to turn off two of the core routers along with the incident links while satisfying the peak demand and yielding a total power consumption of $$2 \cdot (10+2 \cdot 5)=40 \text{ kW.}$$

Exploit Traffic Variations:

The next scenario demonstrates energy savings by exploiting diurnal traffic variations, assuming the connectivity depicted in FIG. 1. Under the low demand regime, only two active routers each with a single active port are needed. A simple calculation shows that the total power consumption in this case is $$2 \cdot (10+5)=30 \text{ kW.}$$

Alternative Network Design:

This scenario illustrates energy savings resulting from re-designing the intra-PoP topology. Consider the topology shown in FIG. 2 where like reference numbers refer to like PoPs and network elements. The variation in topology in FIG. 2 is the difference in connection for intra-PoP links 224$a$-224$h$ as compared to the intra-PoP links of 122$a$-122$h$ of FIG. 1. Under low traffic demand, it can be easily seen that it is possible to turn off all but a single router yielding a total power consumption of $$(10+2 \cdot 5)=20 \text{ kW.}$$

Each of the last two scenarios results in two active ports.

The difference in power consumption stems from the two scenarios requiring different number of active core routers. Thus, in going from an "always on" network to one where the network is carefully designed and enabled to exploit over-provisioning and traffic variations, a factor of four reduction in power can be observed.

The above example demonstrates that even in a even in a simple instance consisting of two routers and two ports/router, significant power savings can be achieved using careful network design and auto-configuration.

Network Model

As a general representation a two-level IP backbone network is considered. At the higher level, referred to as the network level, the network consists of multiple points-of-presence (PoPs). Each PoP provides communication services to regional networks and is also connected to several other PoPs. The graph that represents the network of PoPs is referred to as the network graph.

The internal topology of each PoP constitutes the lower level of the IP backbone network. Here, each PoP consists of several IP core routers (CRs). The CRs have both internal and external links, where an internal link is a connection between two CRs within the same PoP, while an external link is a connection between two CRs in different PoPs or between a CR and an access network. The internal topology of an individual PoP and its links with other PoPs and access networks is referred to as the PoP graph.

As a general representation a two-level IP backbone network is considered. At the higher level, referred to as the network level, the network consists of multiple points-of-presence (PoPs). Each PoP provides communication services to regional networks and is also connected to several other PoPs. The graph that represents the network of PoPs is referred to as the network graph.

The internal topology of each PoP constitutes the lower level of the IP backbone network. Here, each PoP consists of several IP core routers (CRs). The CRs have both internal and external links, where an internal link is a connection between two CRs within the same PoP, while an external link is a connection between two CRs in different PoPs or between a CR and an access network. The internal topology of an individual PoP and its links with other PoPs and access networks is referred to as the PoP graph.

Each PoP A is denoted by G (V, U, E), where $V=\{v_1, \ldots, v_N\}$ denotes a set of N identical CRs inside the PoP. $U=\{u_1, \ldots, u_M\}$ is a set of M access nodes (ANs) that represents other PoPs and regional networks connected to PoP A. The ANs constitute the source and destination of traffic in the model. The set E defines the internal and external connections of PoP A. Each link with capacity normalized to 1 unit. Note that the set E does not contain any links between ANs. Also note that the graph G can be a multi-graph, i.e. two adjacent nodes may be connected by multiple links. Considered are two possible PoP architectures:

1. Multiple Single-Chassis System:

In this architecture, each CR is a single-chassis system and consequently, some of the router ports are used for PoP-internal communication. When considering this architecture, there is assumed a system with N CRs.

2. Single Multi-Chassis System:

A multi-chassis router allows multiple chassis to be clustered together to form a single logical router. In such architecture, several line card chassis are connected to a non-blocking scalable switch fabric matrix via their backplanes. Thus, all the ports are used for external links. When considering this architecture, there is assumed a single CR with N chassis.

Regardless of the architecture considered, there is assumed L line cards per chassis and P ports per line card. Further, every component in the network, a chassis, a line card or a port, is assumed to support sleep mode of operation i.e., each device can be switched to a sleep mode on demand. A device is assumed to consume no power in sleep mode. In particular, the total power consumption T of a CR is given by $$T = \sum_{i=1}^{N_a}\left(W_c + \sum_{j=1}^{L_i}\left(W_l + \sum_{k=1}^{P_{ij}} W_p\right)\right)$$

where $W_c$, $W_l$, and $W_p$ denote the power consumption of each chassis, line card and port respectively. $N_a \leq N$ denotes the number of active CRs, $L_i$ ($1 \leq i \leq N_a$) denotes the number of active line cards in the i-th active CR, and $P_{ij}$ ($1 \leq i \leq N_w$, $1 \leq j \leq L_i$) denotes the number of active ports in the j-th active line card of the i-th active CR.

It is assumed that the time varying traffic demand, $f_{i,j}(t)$, between a pair of ANs $u_i$, $u_j \in U$ is known ahead of time and all the demands are represented by a temporal demand matrix, F(t). The (i, j)-th entry of this matrix is denoted by $f_{i,j}(t)$ and represents the temporal demand between the ANs $u_i$ and $u_j$. The discussion deals with situations in which the traffic demands across different source destination pairs are correlated, i.e., scale uniformly. In general, the traffic demands are considered correlated if the temporal demand matrix F(t) is given by $$f(t)=[f_{i,j}(t)]=[F_{i,j}]\cdot\alpha(t), \forall_{i,j,t}$$

where $F_{i,j}$ is a positive constant that denotes the maximal traffic demand between $u_i$ and $u_j$ and $\alpha(t)$, the temporal load, is a known time varying function in the range [0 . . . 1]. Note that for correlated traffic demands, $\alpha(t)$ is identical for all source-destination pairs at every time instant. Let $r_i(t)=R_i \cdot \alpha(t)$ denote the aggregate temporal demand of node $u_i$, where $R_i = \sum_{j=1}^{M} F_{i,j}$ and represents the maximal traffic demand of node $u_i$.

Method Overview

Optimal power consumption at a PoP is obtained when the number of active ports, denoted by e(t), the number of active line cards, represented by l(t) as well as the number of active CRs, denoted by n(t), are minimized. It is possible to minimize the number of active ports by activating exactly $\lceil r_i(t) \rceil$ ports of each access node $u_i \in U$ at any given time t. However, the problem of minimizing the number of active CRs and line cards is more challenging, since the set of ports chosen for activation determine which CRs and line cards are active. The main challenge is to find a matching between the CR ports and the AN ports that minimizes e(t), l(t), and n(t).

Consider a PoP with N core routers, numbered 1, . . . , N each with L line cards having P ports each. The line cards across the various CRs are numbered 1, . . . , N·L. Similarly, the ports across the various CRs are numbered 1, . . . , N·L·P. In particular, the ports of the first CR are numbered 1, . . . , L·P, while the ports of the first line card of this CR are enumerated from 1, . . . , P. The ports of the second CR are numbered P·L+1, . . . , 2·P·L, and so on. The matching that represents the connectivity between the CR ports and the AN ports is an NKP-tuple, denoted by Λ. The j-th component of Λ corresponds to the AN port that connects to the CR port j.

The main idea behind the method is to arrange the AN ports in an order that they are activated for meeting the traffic demands. More specifically, the tuple Λ ensures that any CR port j is activated only after (or concurrently with) the CR port j−1 and before (or concurrently with) the port j+1.

This may be better understood by considering the following properties.

A PoP design represented by a graph G (V, U, E) is valid, if it satisfies the maximal traffic demands specified by the matrix $F_{max}$.

Given this, the goal of the an auto-configuration method is to find a valid PoP design G (V, U, E) and a schedule S that specifies the active and sleep times of each CR and linecards and ports, such that the traffic demands are satisfied by the active components at every time instant t, while minimizing the overall power consumption of the PoP.

Let $r_i(t)$ be the aggregate demand of the AN $u_i \epsilon U$. The minimal number of active ports at time t is $e_{min}(t)=\Sigma_{i=1}^{M}\lceil r_i(t) \rceil$. The minimal number of active line cards is $l_{min}(t)=\lceil[\Sigma_{i=1}^{M}\lceil r_i(t)\rceil]/P\rceil$ and the minimal number of required active core routers is $n_{min}(t)=\lceil[\Sigma_{i=1}^{M}\lceil r_i(t)\rceil]/(P\cdot L)\rceil$ This may be demonstrated by considering the aggregate demand $r_i(t)$ of any access node $u_i \epsilon U$ at time t. Since the capacity of each link is one unit, the number of active links between access node $u_i$ and the core routers must be at least $\lceil r_i(t) \rceil$. The lower bound $e_{min}(t)$ on the number of required active ports at time t follows immediately. Since every core router has L line cards, each with P ports, it follows that the required number of active line cards and core routers are at least $l_{min}(t)$ and $n_{min}(t)$ respectively.

A PoP design is considered nested if the traffic demands are satisfied by activating only the first $e_{min}(t)$ CR ports, the first $l_{min}(t)$ line cards and the first $n_{min}(t)$ CRs at any given time t.

From the previous discussion it follows that a nested PoP design yields optimal link activation.

The nesting property also ensures the following important result that when the traffic demand changes, the auto-configuration scheme requires minimum number of activation and deactivation operations to satisfy the new demand. The above result is important for limiting the routing instabilities caused by topological changes.

Method Specifics for Multi-Chassis Systems

For each AN port $p\epsilon\{1,\ldots,R_i\}$ of an AN $u_i \epsilon U$, where $R_i$ denotes the maximal aggregate demand of AN $u_i$, there is defined a tuple:

$$w_{i,p} = \left(h_{i,p} = \frac{p-1}{R_i}, u_i, p\right)$$

where $h_{i,p}$ is called the activation threshold of port p. More specifically, port p is activated if $\alpha(t) > h_{i,p}$. The port arrangement $\Lambda$ is then obtained by sorting the AN ports according to a lexicographical order, i.e., based on the tuples $w_{i,p}$. Each AN port p of node $u_i$ and its counterpart CR port are activated when the temporal load $\alpha(t)$ exceeds $h_{i,p}$. Similarly, a CR is switched to active mode if at least one of its ports is active. Otherwise, it remains in sleep mode.

A pseudo-code representation of the method is as follows:
For every AN $u_i \epsilon U$, every port $p\epsilon[1,R_i]$, do $$w_{i,p} \leq h_{i,p} = \frac{p-1}{R_i}, u_i,$$

$p > \Lambda = \{w_{i,p} \mid$ sorted in increasing lexicographical order$\}$ for every CR $j\epsilon N$ do
connect CR j with the AN ports $(j-1)\cdot L\cdot P+1$ to $j\cdot L\cdot P$ in $\Lambda$ when considering line cards.

The connections defined by this method satisfies the nesting property. It can be seen that this method activates only $$e(t) = e_{min}(t) = \sum_{i=1}^{M}\lceil r_i(t) \rceil$$

links. Consider the AN $u_i$. At time t, the Port-Sorting method activates a port p of $u_i$ only if $h_{i,p} < \alpha(t)$. It follows that the number of active ports of AN $u_i$ is $\lceil R_i \cdot \alpha(t) \rceil = \lceil r_i(t) \rceil$. Thus, the total number of active ports of $u_i$ meets the lower bound for the minimum number of active ports.

Further, the method activates only $\lceil e(t)/P \rceil$ line cards and $\lceil e(t)/P\cdot L \rceil$ core routers. Since the AN ports are sorted according to their activation thresholds, every port p' of AN $u_j$ that appears before port p of node $u_i$ in the sorted order satisfies:

$h_{j,p'} < h_{i,p}$ and therefore, p' will be active whenever port p is. It then follows that only the first $e_{min}(t)$ AN ports in $\Lambda$ are active at time t. Consequently, only the CR ports with index less than or equal to $e_{min}(t)$ are active at time t.

Figures 3A, 3B:
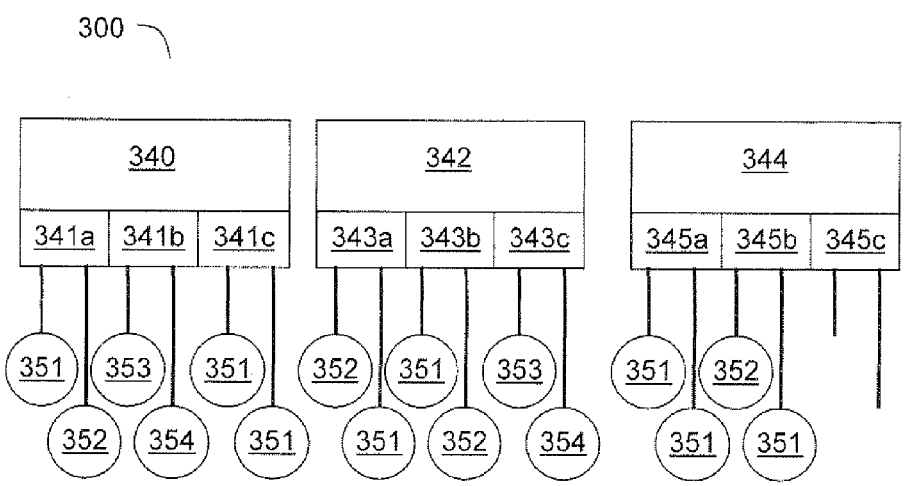
FIGS. 3A and 3B illustrates a PoP and its access port arrangement according to an embodiment of the invention.

Referring to FIG. 3a there may be seen an example of an embodiment that demonstrates the operation of the port-sorting method of the invention. In FIG. 3a there may be seen PoP 300 having N=3 CRs 340, 342, and 344 each with L=3 line cards 341a, 341b, 341c; 343a, 343b, 343c; and 345a, 345b, 345c; respectively with each having P=2 ports. There may be further seen four ANs 351, 352, 353, and 354 denoted as U={$u_i,\ldots,u_4$} respectively. The first AN is an adjacent PoP and the other three represent regional networks. For simplicity, it is assumed that there is traffic only between each of the ANs {$u_2, u_3, u_4$} and the PoP $u_1$ (i.e., no traffic between the ANs), and the maximal traffic demand of the ANs are $R_2=4$, $R_3=R_4=2$, while the other PoP $u_1$ has a maximal traffic demand $R_1=8$. FIG. 3a shows the PoP design resulting from the Port-Sorting method, while FIG. 3b shows the port arrangement tuple $\Lambda$. For ease of presentation in FIG. 3b, the AN ports are arranged in four rows, each row corresponding to the ports of one of the ANs. Notice that in this design, only CR-1 340 and its first 341a and second 341b line cards are active all the time. As $\alpha(t)$ is increased, additional CRs and line cards are activated. For instance, CR-2 342 is activated when $\alpha(t)>¼$ and CR-3 344 when $\alpha(t)>⅝$. For the latter, traffic needs to be exchanged between CR-2 342 and CR-3 344 and hence, the two CRs should be connected. This situation requires additional treatment in the method as will be further described.

Method Specifics for Single-Chassis Systems

In some PoP designs, internal traffic (i.e., traffic between CRs inside a PoP) is unavoidable. In this section there is proposed a star topology for inter-connecting the CRs inside a PoP. Here, an additional CR, termed the hub node is connected to all the other CRs and relays all the PoP-internal traffic.

It is assumed that every CR (excluding the hub node) dedicates Q of its L·P ports for PoP-internal traffic, while the remaining K=L·P−Q ports are used for external traffic. The Q ports dedicated for internal traffic may be uniformly distributed among the line cards of each CR, or alternatively may be associated with one or a few line cards. While this design choice impacts the number of active line cards of a CR, it does not impact the amount of PoP-internal traffic. As Q depends on the traffic matrix and the connectivity between the ANs and the CRs inside a PoP, an iterative process is used for calculating K and Q. The process starts by initializing Q=0 and K=P·L. In each iteration, Q is increased by 1 and set K=P−Q until there is found a PoP configuration that satisfies the traffic demands. Note that such a design can be found for $Q \geq L \cdot P/2$. In each iteration, the method performs the following two steps:

1. First, it calculates a PoP configuration by using the Port-Sorting method previously described.
2. It then uses a linear program LP1 to check if Q ports are sufficient for supporting the PoP-internal traffic under maximal traffic load, i.e., $\alpha(t)=1$.

A formal description of the method is given in pseudo-code as:

$Q=-1$; Found=FALSE repeat $Q=Q+1$, $K=L \cdot P-Q$

Calculate a PoP configuration, each CR with K ports
$\tilde{Q}$=Solution of LP1
if (LP1 has feasible solution) and $\tilde{Q} \leq Q$ then Found=TRUE until (found==TRUE)
Return PoP configuration and Q Next, linear program method LP1 is described. Consider the maximal demand matrix $F_{max}$ and a PoP design G (V, U, E) with $S_i^a$ links between AN $u_i \in U$ and CR $v_i \in V$. The LP uses the following variables:

for every pair of ANs $u_i, u_j \in U$ and CR $v_a, v_b \in V$, let $y_{i,j}^a \geq 0$ denote the amount of traffic from $u_i$ to $u_j$ that traverses CR $v_a$. In addition, let $h_{i,j}^{a,b} \geq 0$ denote the amount of traffic from $u_i$ to $u_j$ through the hub node along the path $\{u_i, v_a, hub, v_b, u_j\}$.

Note that this formulation does not assume identical traffic demands in both directions for any pair of ANs.

In linear program LP1 as described below, Constraints (2a) and (2b) verify that Q is an upper bound for the traffic between the hub node and each CR in each direction. Constraint (2c) is a flow constraint to ensure that the solution of the LP satisfies the traffic demand between every source-destination pair. Constraints (2d) and (2e) are capacity constraints that verify that the flow assignments do not violate the available capacity between every CR-AN pair.

LP1 may now be described by the following:
LP1: min Q
subject to:

$$\forall v_a \in V: \quad Q \geq \sum_{u_i, u_j \in U, v_b \in V} h_{i,j}^{a,b} \quad (2a)$$

$$\forall v_a \in V: \quad Q \geq \sum_{u_i, u_j \in U, v_b \in V} h_{i,j}^{b,a} \quad (2b)$$

$$\forall u_i, u_j \in U: \quad F_{i,j} = \sum_{v_a \in V} y_{i,j}^a + \sum_{v_a, v_b \in V} h_{i,j}^{a,b} \quad (2c)$$

$$\forall u_i \in U, v_a \in V \quad S_i^a \geq \sum_{u_j \in U} y_{i,j}^a + \sum_{u_j \in U, v_b \in V} h_{i,j}^{a,b} \quad (2d)$$

$$\forall u_i \in U, v_a \in V \quad S_i^a \geq \sum_{u_j \in U} y_{j,i}^a + \sum_{u_j \in U, v_b \in V} h_{j,i}^{b,a} \quad (2e)$$

$$\forall u_i, u_j \in U, v_a \in V \; y_{i,j}^a \geq 0 \quad (2f)$$

$$\forall u_i, u_j \in U, v_a, v_b \in V \; h_{i,j}^{a,b} \geq 0 \quad (2g)$$

Figures 4A, 4B:
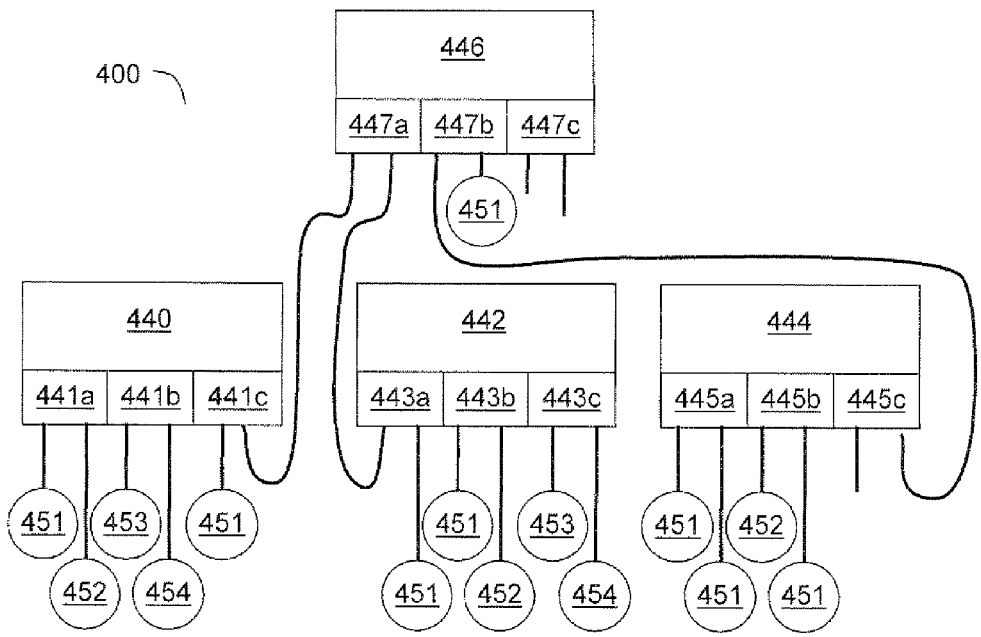
FIGS. 4A and 4B illustrates a PoP and its access port arrangement according to another embodiment of the invention.

Referring to FIG. 4a the issue of PoP-internal traffic may now be considered in detail. As mentioned in reference to FIG. 3a above, when $\alpha(t) > 5/8$ CR-2 342 and CR-3 344 must be connected. In the alternative configuration of FIG. 4a, each CR 440, 442, and 444 is connected to a hub node 446 with a single link, i.e., Q=1. This additional connectivity is sufficient to support the maximal traffic demands with minimal Q. FIG. 4b presents the activation thresholds of the ports as calculated by Port-Sorting method.

Observe that the configuration shown in FIG. 4a can be improved by connecting CR-1 440 and CR-2 442 directly and shifting the port of AN $u_1$ from the hub node 446 to CR-3 444. This alternative configuration, depicted in FIG. 5, enables removing the hub node 446 of FIG. 4a, while continuing satisfying the maximal traffic demand.

Auto-Configuration Method

An auto-configuration method for minimizing the total number of active components, while meeting the temporal traffic demands for a given $\alpha(t)$ is now given. The auto-configuration method also takes PoP-internal connectivity into consideration. In accounting for the temporal traffic demand of the PoP, activation of additional external links may be required.

As described before, a new link is activated only when $\alpha(t)$ exceeds a certain threshold, given by the sorted vector $$\vec{A} = \left\{ \frac{j}{R_i} \; \middle| \; \forall u_i \in U, j \in \{0, \ldots, R_i - 1\} \right\}.$$

Given two consecutive values $\hat{\beta}, \check{\beta} \in \vec{A}$, $\hat{\beta} < \check{\beta}$, the following process determines the auto-configuration for a given temporal load $\alpha(t) \in (\hat{\beta}, \check{\beta}]$. The method seeks to satisfy the nesting property in by activating links connected to CRs with low indexes before activating links attached to CRs with higher indexes. A weight $w_a = j$ is associated to every link attached to CR $v_a \in V$ with index j and a weight $w_h$ to all the links attached to the hub node. In this method it is preferred to use internal links over additional external links. Consequently, the setting used is $w_h = 1$. Linear program LP2 is then used to minimize the total weight of the flows between the CRs and the ANs. Linear program LP2 has the same variables as linear program LP1 as well as the following new ones.

Each variable $g_i^a \geq 0$ is used as an upper bound on the traffic between AN $u_i$ and CR $v_a$, while $x^a \geq 0$ upper bounds the traffic between a CR $v_a \in V$ and the hub node.

Linear program LP2 has the following constrains: constraints (3a), (3b) and (3c) verify that $g_i^a$ is an upper bound of the traffic between AN $u_i$ and CR $v_a$ without violating the capacity between the two nodes. Constraints (3d), (3e) and (3f) ensure similar conditions between the CRs and the hub nodes, while Constraint (3g) ensures that LP2 satisfies the traffic requirements. Consequently, for a given load $\alpha(t) \in (\hat{\beta}, \check{\beta}]$, the number of active links between any AN-CR pair $u_i$ and $v_a$ output by LP2 is $\lceil g_i^a \rceil$ and the number of active links between any CR $v_a \in V$ and the hub node is $\lceil x^a \rceil$.

Figure 5:
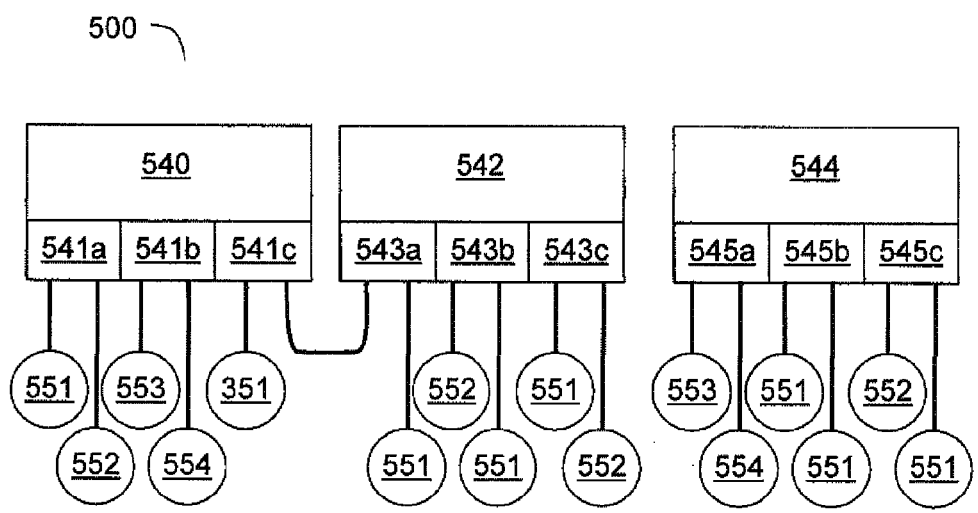
FIG. 5 illustrates a PoP according to another embodiment of the invention.

Recall that linear program LP2 with some minor modifications may be used to find the optimal activation thresholds of the ports for the configuration shown in FIG. 5. Consequently, meeting the temporal traffic demands with minimal number of components also for $$\alpha(t) \in \left( \frac{1}{2}, \frac{5}{8} \right].$$

$$\min \sum_{u_i \in U, v_b \in V} w_a \cdot g_i^a + \sum_{v_a \in V} w_h \cdot x_a \quad \text{LP2}$$

subject to:

$$\forall\, u_i \in U,\, v_a \in V:\ g_i^a \geq \sum_{u_j \in U} y_{i,j}^a + \sum_{u_j \in U, v_a \in V} h_{i,j}^{a,b} \quad (3a)$$

$$\forall\, u_i \in U,\, v_a \in V:\ g_i^a \geq \sum_{u_j \in U} y_{j,i}^a + \sum_{u_j \in U, v_a \in V} h_{j,i}^{b,a} \quad (3b)$$

$$\forall u_i \in U, v_a \in V:\ s_i^a \geq g_i^a \quad (3c)$$

$$\forall\, v_a \in V:\ x^a \geq \sum_{u_i, u_j \in U, v_b \in V} h_{i,j}^{a,b} \quad (3d)$$

$$\forall\, v_a \in V:\ x^a \geq \sum_{u_i, u_j \in U, v_b \in V} h_{j,i}^{b,a} \quad (3e)$$

$$\forall v_a \in V:\ Q \geq x^a \quad (3f)$$

$$\forall\, u_i, u_j \in U:\ F_{i,j} \cdot \beta = \sum_{v_a \in V} y_{i,j}^a + \sum_{v_a, v_b \in V} h_{i,j}^{a,b} \quad (3g)$$

Simulation Results

The various energy saving methods disclosed are assumed to be deployed in a single PoP (henceforth, called PoP A). In a simulation set up, PoP A has four adjacent PoPs and ten adjacent regional networks. The 14 ANs (4 PoPs+10 regional networks) are the sources and destinations of all generated traffic in the simulation setup, all of which is assumed to transit PoP A.

Without loss of generality, the simulation assumes a single linecard per CR throughout. This assumption simplifies the discussion without impacting the generality of the results presented. Each CR inside PoP A has P ports (P=8, 12, 16 in the simulations) each carrying one unit of traffic (Notice that in this section P denotes the total number of ports of a core router). Some of these ports carry external traffic, while the remaining ports carry traffic between the CRs inside PoP A. As described previously, the core routers are assumed to be connected to each other via a hub node, which is also assumed to have P ports. For the simulation, the power consumption of each active port is assumed to be 0.5 kW, while the power consumption of a CR chassis depends on the number of ports it has. For the simulation the assumptions were that the power consumption to be 4 kW, 6 kW and 8 kW for a CR with 8, 12 and 16 ports respectively. It is important to emphasize that although the absolute power consumption of different evaluated algorithms may vary under different assumptions, it is to be expected that the relative performance of the different algorithms to be similar.

The following method is used for specifying the traffic demand between each source-destination pair. The maximal traffic (incoming and outgoing) handled by PoP A is fixed, which is then divided into three classes, viz. PoP-PoP, PoP—regional network, and regional network—regional network traffic, according to a fixed allocation (30%, 40% and 30% respectively in the simulation setup). The traffic within each class is further divided equally among all source-destination pairs belonging to the class. To ensure the generation of realistic traffic patterns, the initial demand is multiplied with a random variable that is uniformly distributed in the range [1/4, 7/4]. In the simulations, 40 distinct traffic instances were generated, where the required capacity for supporting the peak traffic demand of each instance is between 60 and 80 traffic units.

Candidate Algorithms for Simulation Comparison

The various candidate algorithms differ based on:

(i) the algorithm used for determining the connectivity between the ANs and the CRs inside a PoP, and (ii) The auto-configuration process.

Random Scheme:

Here, the links from the ANs to the CRs of PoP A (excluding the hub nodes) are distributed uniformly at random across the CRs. More precisely, each link randomly chooses an available port across the CRs to connect to. The total number of links from a given AN is determined by its peak demand. In addition, the random design was selected that minimizes the PoP-internal traffic, i.e., for every traffic instance and for every value of K and Q, there were generated 10 random PoP designs. The design with the minimal number of internal links, i.e., minimal Q while satisfying the traffic demands was chosen. For each AN, a subset of its links were chosen uniformly at random to carry its traffic.

Greedy Scheme:

In this scheme, the inter-connections between the ANs and the CRs is determined in an identical fashion as in the Random scheme. A Greedy heuristic is then used for activating CRs. In each step, a weight is calculatee associated with every CR, which represents the total amount of (as yet) unallocated traffic demand from the access nodes that it can satisfy. The core router with the maximum weight is then activated and the process is repeated until the traffic demand of each access node is satisfied.

Bundled Link PoP Design Scheme:

This scheme is inspired by the commonly used bundled link technique that combines multiple physical links into a single logical link. In this scheme, traffic of the access nodes is bundled over a small number of logical links, so that each access node is physically connected to at most two CRs. Lower bounds on the number of external links and core routers are calculated. These calculations ignore internal traffic and assume that all the CR ports are used only for external traffic.

The simulation results demonstrated significant advantages of the Port-Sorting method over other candidate solutions. The method is particularly attractive for the case when P=12, 16, where the resulting PoP configurations yield near-optimal power consumption, and provide more than 3× in power savings over any possible always-on strategy under normal traffic.

From the simulation results PoP designs based on the Bundled Links scheme require significantly higher number of active CRs than the other candidate algorithms. In particular, the number of CRs in PoP A that are required to support the maximal traffic demands are were simulated for α=100%. This is the number of CRs that need to be deployed in the PoP. The results showed that the Bundled Links approach requires more than twice the number of CRs required by the Port-Sorting method of the invention. This demonstrates that the method of the invention not only reduces the power consumption but also yields benefits from a considerable equipment cost saving.

Thus summarizing, when compared to the state-of-the-art, which leaves all network components running at all times, the methods of auto-configuration according to embodiments of the invention achieve a factor of three or more savings in energy over a wide range of values of the demand-capacity ratio. The simulations also show that in addition to significant energy savings (factor of 5) when compared to link bundling based network design, the scheme also achieves a 2× (or more) reduction in the number of required core routers for supporting the maximal traffic demands. These savings are achieved by eliminating PoP-internal traffic almost entirely in contrast to the link bundling approach which yields a large amount of PoP-internal traffic.

Therefore, what has been disclosed is a method and system for determination of a set of activation thresholds, and an ordering of ports connecting access nodes and core routers such that a given port is activated only under the conditions that the temporal traffic demand exceeds the activation threshold associated with that port. A given linecard is only activated if at least one of its ports is activated. Likewise, a given core router is only activated if one of its linecards is activated. If a device is not activated, it resides in sleep mode, minimizing power consumption. The port sorting method provided accounts for traffic demands on both external (POP to PoP) links, and internal (CR to CR within the PoP) links. The auto-configuration method also has the advantage of ordering the port activation such that only a minimum number of activation and deactivation operations to satisfy a new demand is required. This property is advantageous for limiting the routing instabilities caused by topological changes.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media.

The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method of activating network elements within a Point-of-Presence node having a first core router, a set of linecards having respective ports associated with said first core router, said activation in respect of a traffic demand associated with the Point-of-Presence node, said method comprising the steps of:

calculating a set of activation thresholds wherein each port of said set of linecards has a respective activation threshold;

determining the traffic demand at a particular point in time;

activating a particular port on a linecard if the respective activation threshold is exceeded by the traffic demand;

placing said particular port in a power minimization mode if the respective activation threshold is not exceeded by the traffic demand; and wherein a linecard in said set of linecards is placed in a power minimization mode if no ports on said linecard are activated.

2. A system within a Point-of-Presence node having a first core router, a set of linecards having respective ports associated with said first core router, and a traffic demand associated with the Point-of-Presence node comprising:

a memory having a set of activation thresholds wherein an activation threshold is associated with a port of said set of linecards; and a controller which activates a particular port on a linecard in the event that the traffic demand exceeds the respective activation threshold associated with that port; and which places said particular port in a power minimization mode if the respective activation threshold is not exceeded by the traffic demand; and which also places a linecard in said set of linecards in a power minimization mode if no ports on said linecard are activated.

* * * * *